Aug. 4, 1942.   W. C. INMAN ET AL   2,292,078
HANGAR OR LIKE SHELTER, MORE PARTICULARLY FOR AIRCRAFT
Filed Dec. 7, 1940   5 Sheets-Sheet 1

INVENTORS:
WILLIAM CHARLES INMAN
GRAHAM RICHARDS DAWBARN
BY:
Francis E. Boyce
ATTORNEY

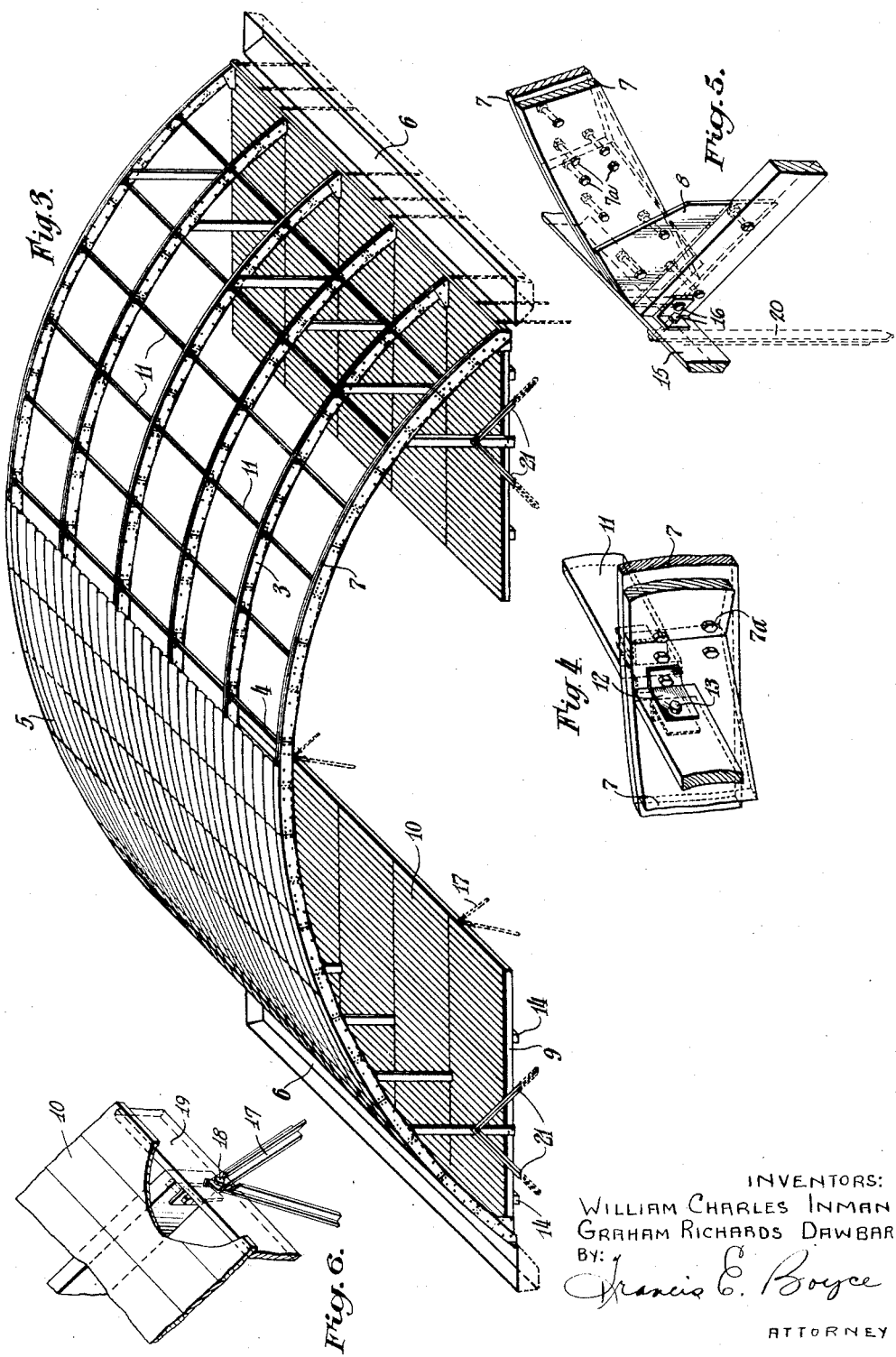

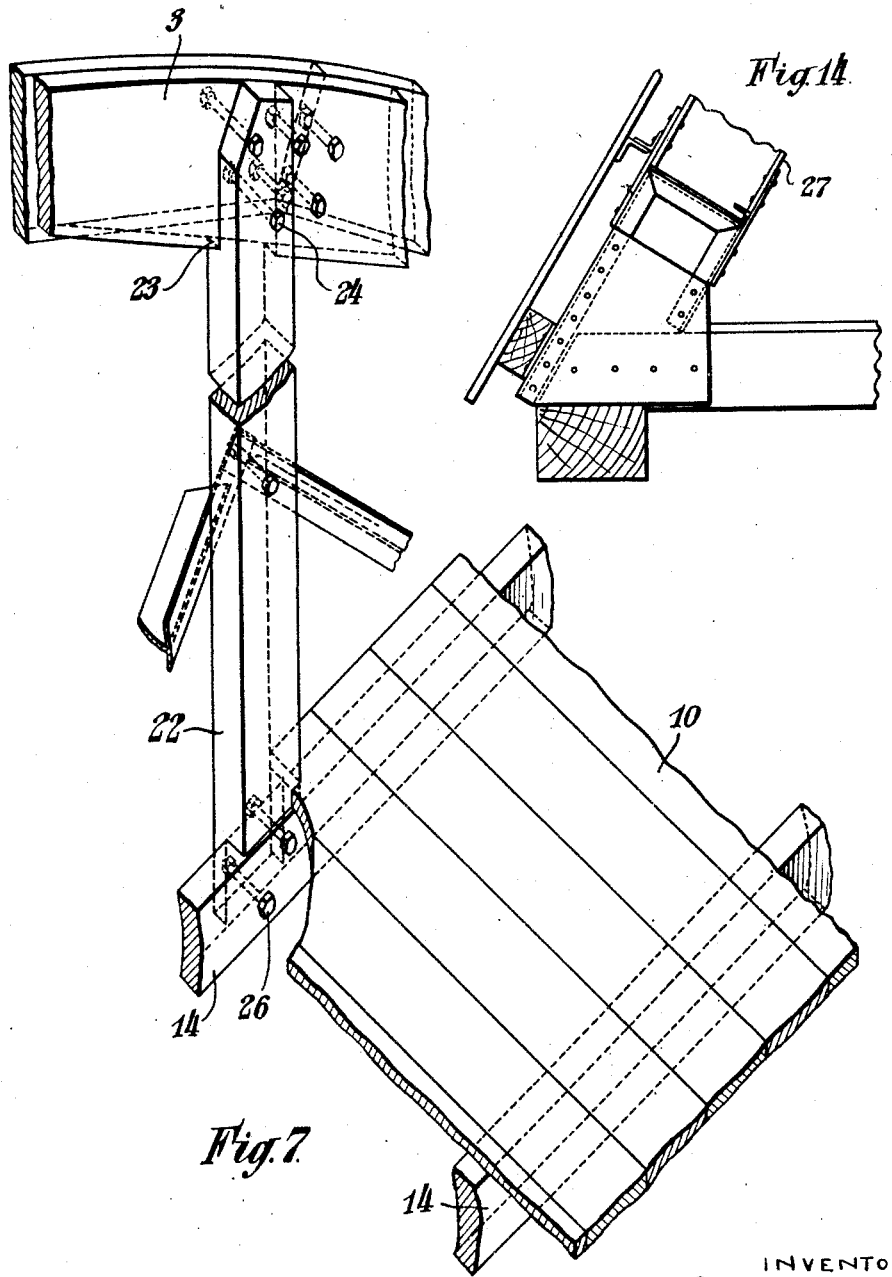

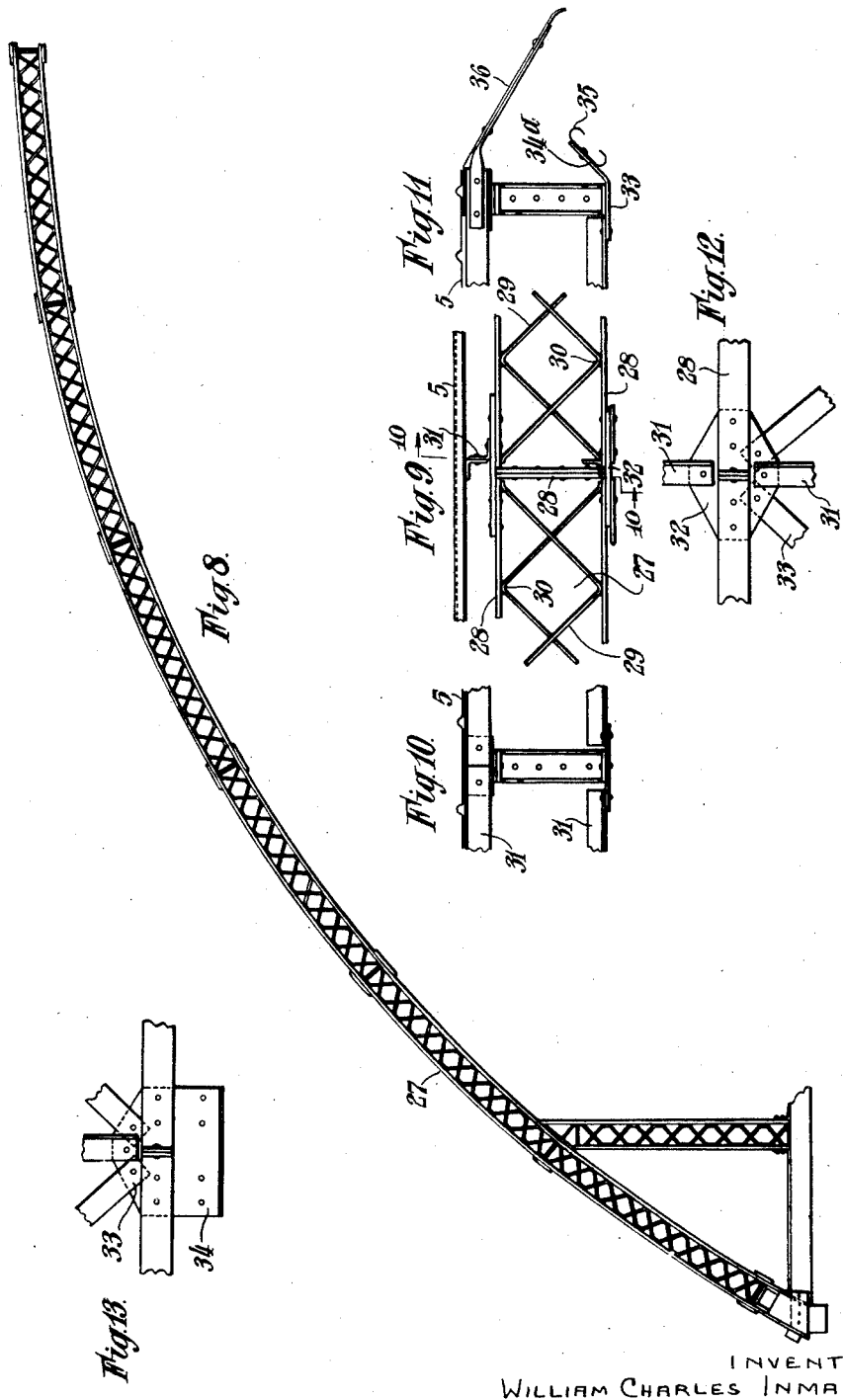

Aug. 4, 1942.   W. C. INMAN ET AL   2,292,078
HANGAR OR LIKE SHELTER, MORE PARTICULARLY FOR AIRCRAFT
Filed Dec. 7, 1940   5 Sheets-Sheet 5
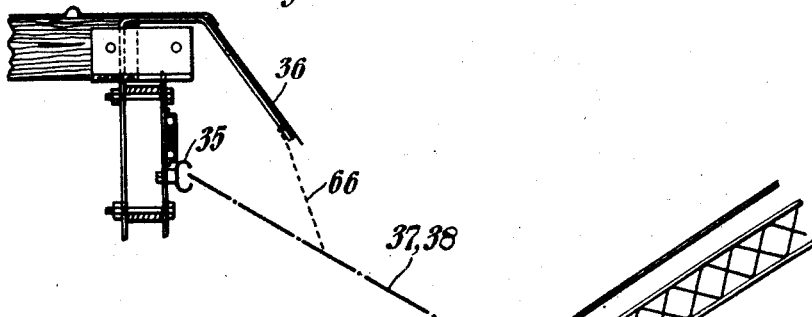
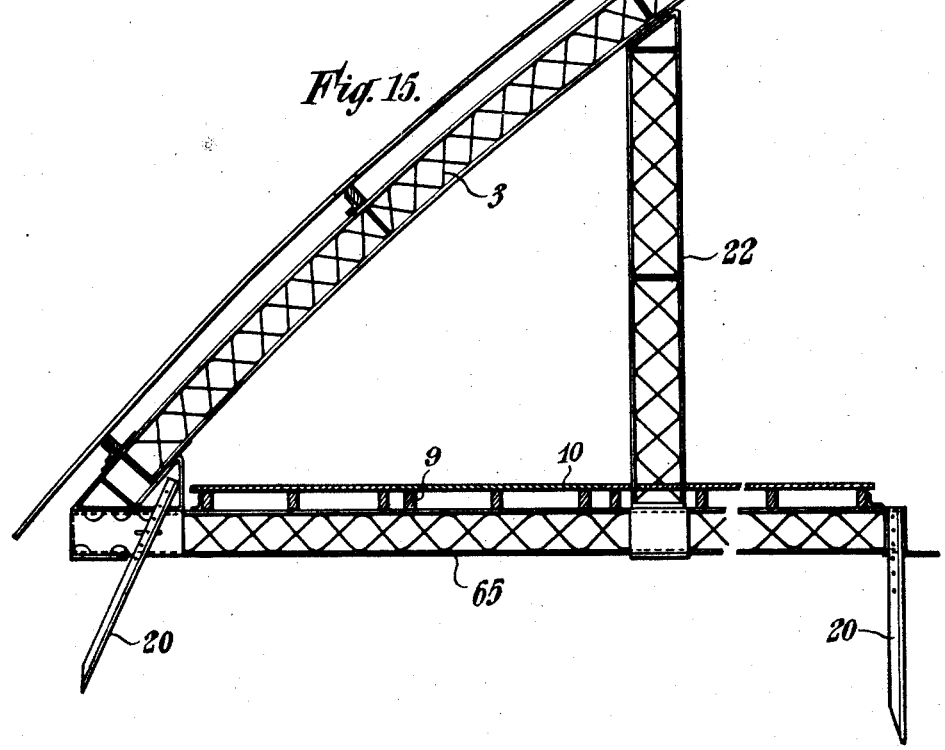
INVENTORS:
WILLIAM CHARLES INMAN
GRAHAM RICHARDS DAWBARN
BY: Francis E. Boyce
ATTORNEY Patented Aug. 4, 1942

2,292,078

UNITED STATES PATENT OFFICE 2,292,078

HANGAR OR LIKE SHELTER, MORE PARTICULARLY FOR AIRCRAFT

William Charles Inman, London, and Graham Richards Dawbarn, Woking, England

Application December 7, 1940, Serial No. 369,012
In Great Britain November 28, 1939

3 Claims. (Cl. 189—1.5)

This invention relates to hangars and like shelters and is intended more particularly for housing aircraft, especially fighter aircraft under war conditions, the object of the invention being to provide an easily erected structure without excavated foundations which will efficiently house preferably a single machine and permit quick egress from either end and in addition provide accommodation for attendant personnel and furthermore be of such a character that, when adequately camouflaged, it is practically indistinguishable from its surroundings when viewed from the air. The invention, however, is applicable to other uses.

According to the invention an aircraft hangar or like shelter comprises an open-ended roof structure of arch form or arcuate cross section springing directly from the ground and wherein the open ends of the roof structure are fitted each with a hood capable of being collapsed to permit access to or egress from the hangar and of being extended to close the open ends of the hangar, the hoods forming, when closed continuations of roof structure sloping gradually to the ground.

In the construction of the shelter it is primarily intended to make use of a plurality of aligned ribs disposed in parallelism, each rib being a composite member built up of a plurality of units fabricated of wood and such construction has proved extremely effective where aircraft of the smaller type, such as "Spitfires" have to be accommodated. Ribs constructed solely of wood, however, have certain size limitations placed upon them so that when aircraft for example of a larger type such as heavy bombers are to be accommodated, wooden ribs under certain conditions do not satisfy requirements.

The invention therefore also visualizes the use of ribs of metal each comprising a plurality of sections or units. The sections or units consist preferably of rectangular or curved frame members, formed for example by mild steel flat strips, R. S. channels or angles, braced by an interiorly disposed continuous zig-zag mild steel rod which is welded at alternate bends to the oppositely disposed longer sides of the frame. Preferably, a pair of such steel rods are welded in position, being staggered to provide a diamond-shaped lattice pattern.

Generally the shelter comprises an arch-shaped structure composed of a plurality of aligned ribs either of wood or of metal disposed in parallelism and spaced by means of purlins, the outer surface being covered by corrugated metal sheets or metal lamellae. The roof structure thus provided is intended to lie upon the ground, the arch-like form springing directly from the edges or eaves, suitable gutters or gullies being formed in the adjacent ground surface. Each open end of the roof structure is fitted with a roller track which follows the arc of the roof and supports a curtain divided diametrically and capable of being drawn apart to each side of the roof structure. The curtains in their extended form, that is to say when they are drawn to close the openings at the ends of the structure, are given a convex shape or bellied out by the aid of struts or lines or other means which in the open position of the hood lie flat on the ground to permit aircraft to enter or leave the hangar.

Preferably, platforms or stagings are fitted within the hangar to extend from the eaves thereof towards the centre, such platforms providing space for stores and/or sleeping quarters for personnel.

In order that the invention may be clearly understood, reference is directed to the accompanying drawings wherein:

Figure 3 is a perspective view of the hangar showing the interior fitting thereof and with the hoods removed and a part of the roof covering detached to show the framework of the roof.

Figure 4 is a perspective view on an enlarged scale showing the method of fixing the transverse members of the roof structure to the ribs thereof.

Figure 5 is a perspective view showing the method of fixing the rib at the point where it springs from the ground and the arrangement for anchoring the roof structure in position.

Figure 6 is a detail of the platform or staging showing the method of support and fixing to the ground.

Figure 7 is a perspective view showing in detail the method of strutting the roof structure between floor and rib.

All the foregoing figures are concerned more particularly with the construction of hangar constructed principally of timber.

Figure 8 is a part elevation of a hangar illustrating a modified form of construction in which steel plays the principal part.

Figure 9 illustrates on a larger scale the method of connecting the units of the part girder shown in Fig. 8 and the associated purlins for a supporting roof covering.

Figure 10 is a section on the line 10—10 of Fig. 9.

Figure 11 is a similar view to Fig. 10 but showing one of the end girders fitted with a roller guide and hood covering therefor.

Figures 12 and 13 show details of bracing members for connecting together adjacent ribs of the roof structure.

Figure 14 is a view on a still larger scale showing the method of fixing the roots of the girders where they spring from the platform.

Figure 15 is a somewhat similar view to Figure 8 but shows a modified form of construction in which the base of the hangar is also formed by the use of steel frame units.

Figure 16 is a similar view to Figure 11 showing a modified form of roller guide and hood covering therefor.

Figure 1:
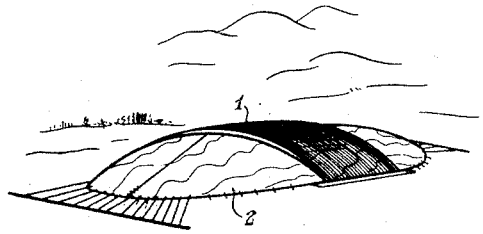
Figure 1 is a pictorial representation of a hangar or like structure constructed and erected in accordance with the invention.
Figure 2:
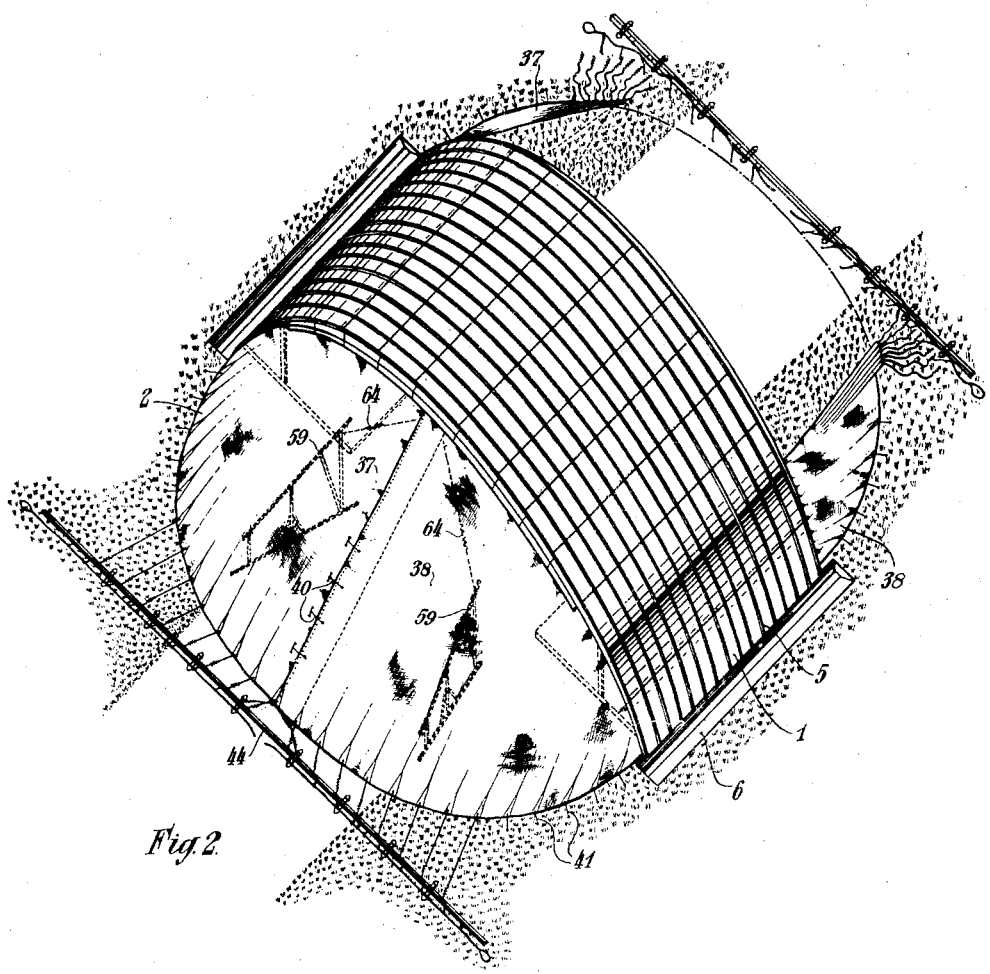
Figure 2 is a perspective view somewhat similar to Figure 1 showing the hangar complete with hoods, one of which has been collapsed.

The aircraft hangar or shelter illustrated in the drawings comprises a roof structure 1 of arcuate cross section the open ends of which are closed by hoods 2 which may be collapsed as shown at the right-hand side of Fig. 2 to give access to the shelter. It will be observed each of the hoods when closed conforms at one end to the curvature of the roof and slopes gradually from the roof to the ground (see Fig. 1) whereby shadows are substantially eliminated. Both in the construction of the shelter illustrated principally in Figs. 2 to 7 which illustrate a form of shelter constructed principally of timber and in the shelter illustrated in Figs. 8 to 14 which serve to illustrate a construction formed principally of metal use is made of a plurality of aligned ribs 3 built up of a number of units, the ribs being connected by transverse members or purlins 4. The roof structure is covered by corrugated metal sheets 5 and the surface water therefrom falls to gutters 6 excavated if required in the soil adjacent the eaves of the building.

Referring now more particularly to Figures 2 to 7 which illustrate the construction of shelter carried out mainly in wood. Each rib 3 of the roof is a composite member built up of a plurality of sections in the form of boards 7 which may each have the curvature of the principal arc on one or both of their longer sides, but certainly on their outer longer side, or they may be rectangular. The boards are connected by bolts 7a in overlapping relationship to form a complete rib 3. Each rib 3 where it springs from the eaves is connected by a fish plate 8 to one of a number of floor joists 9 which support a platform or staging 10. The ribs are bolted one to another by purlins 11 through the intermediary of mild steel angle iron member 12 and bolts 13. The structure is covered with corrugated steel 5, asbestos or other sheeting secured in the known manner and at the eaves of the roof structure sheds surface water to the gullies 6 formed in the ground if required to receive and carry away the drainage. In order to ensure that shadows will not be formed by the gulley 6, they may be covered by an additional sheet of material which rests upon the lower part of the roof structure and bridges the gulley or the gullies may be filled with rubble or other porous material.

The platform or staging 10 secured to the joists 9 is mounted on bed plates 14 and is of known construction. The joists are connected at the eaves to the ribs 3 through the intermediary of the fish plates 8 and to a barge board 15 by means of the angle members 16.

The staging 10 is anchored to the ground by means of diagonal stakes 17 (see Fig. 6) which are bolted at 18 to a skirting 19 forming the front edge of the staging 10. In addition, the barge board 15 is anchored to the ground by stakes 20 which are driven into the ground and bolted to the barge board 15 through the intermediary of the angle member 16. In addition to the stakes 17 and 20, stakes 21 partly embedded in the ground are employed at the ends of the staging which serve to strut a vertical post 22 (see Fig. 7) and at the same time anchor the staging and thereby the roof to the ground. The posts 22 form essential supports between the staging 10 and the roof structure, the strut 22 being connected to one of the series of ribs 3 by being shouldered at the end as at 23 to support the rib to which it is bolted by means of the bolts 24, the lower ends of the posts 22 are shouldered as at 25 to rest on the floor joists 14 to which they are bolted by the bolts 26. The floor or staging 10 need only extend into the interior of the hangar approximately a quarter of the floor area from each side, the central area being left clear for entry of the aircraft, the entire structure being in the neighbourhood of 25 feet in depth by 60 feet in width and approximately 14 feet high at its highest point, although the size may be varied to suit the type of aircraft to be sheltered.

The rib 3 when built up of a number of frame units 7 provides an arcuate-shaped rib for the purpose described. In addition to the ribs 3, the purlins 11 connecting adjacent ribs as well as the vertical posts 22, which are interposed between the inner side of the roof structure and connected to the floor joists, may be similarly formed from board units 7.

In the construction of shelter illustrated more especially in Figures 8 to 14 of the drawings, each arcuate-shaped rib 3 is built up of a number of frame units 27 of rectangular or curved form, each consisting of four flat mild steel members 28 welded together at the corners to form a frame unit and stiffened by zig-zag-shaped mild steel rods 29 which are welded between the two longer walls of the frame unit at the points 30. Although the rods 29 are shown disposed in the central plane of the frame unit 27, they may be disposed at the edges of the frame unit and parallel to the central longitudinal plane thereof. A pair of zig-zag-shaped rods 29 are employed in overlapping relationship, being welded as at 30 at the bends or points of contact with the frame unit. The frame units 27 are bolted together to form a complete rib, a part of which is shown in Figure 8, and the aligned ribs connected by purlins 31 of angle iron by means of fish plates 32 according to recognized principles to provide a complete roof structure. 33 are diagonal struts which are fitted, as a rule between the outer rib and the next adjacent, fish plates 34 being provided for this purpose which also extend outwardly and upwardly of the outer rib 3 as shown at 34a to form a support for a roller guide or run-way 35, the latter being protected by a soffit 36 (see Figure 11).

It will be appreciated that the construction of the frame units may take any shape, the outer members being formed of material of any suitable rolled steel cross section such as channel H-section or angle connected by welded or bolted joints and braced by a continuous system or systems of bent rods welded at their points of contact to the outer members forming the frame units.

The frame units so formed are bolted together either directly through the outer members and/or by fish plates and gusset plates to form any desired structural shape.

In particular, the frame units herein described for the present purpose illustrated in Figures 8 to 14 of the drawings are composed of mild steel flats forming the outer longitudinal members connected at their ends by means of shorter mild steel flats, the whole being welded together to form a frame unit of rectangular or curved form.

The roof structure formed from a number of aligned ribs 3 is covered with corrugated sheets 5, canvas or other material, either connected direct to the structure or held thereto by the purlins 31.

Platforms or stagings 10 are fitted within the hangar to extend from the eaves thereof towards the centre. By this means the weight of the arched structure is spread, by virtue of the combination of arch, upright struts and horizontal members, onto the bearers under the staging. The structure can consequently be erected without excavated foundations on sites having gentle gradients or irregularities.

The open ends of the roof structure constructed either in accordance with the form illustrated in Figures 2 to 7 or Figures 8 to 14 of the drawings are closed as hereinbefore described by means of hoods 2 which offer, when closed, a generally rounded surface or convex shape in cross-section. The hoods 2 are each formed by a pair of curtains 37—38 meeting at the centre line of the structure and mounted on roller runways 35 (Figure 11), being opened simultaneously from the centre line of the structure towards each end of the hangar to bunch up at the eaves, struts or other members which are employed to intermediately support the hoods also collapsing with the hood to lie flat on the ground and leave clearance for entering or leaving aircraft. The runway 35 which carries the hoods follows the curve of the roof structure 1 and is covered by the sheet metal soffit 36 which also follows the curve of the roof to provide protection for the metal runway. The said sheet metal soffit 36 by following more or less the rounded contour of the hoods 2 when they are closed, also serves to minimise shadows where the hood joins the roof.

It will be appreciated that the arcuate cross section of the roof can, except for the moment when the sun is practically horizontal, only cause shadows at its open ends and that if these ends are closed by the hoods which form spherical segmental closures at each end, the appearance from above will be in the form of a small hillock or mound and hardly perceptible from the air due to the absence of shadows. At the same time, sufficient space is provided for necessary stores and personnel and adequate protection is also given to the aircraft.

In Figure 15 a construction is illustrated in which the arcuate-shaped ribs 3 are formed integral with the vertical posts 22 and a base member 65, the latter member being formed in a similar manner to that of the rib from a number of frame units or a single frame unit built up in the manner previously described. The base members 65 form joists and are spaced along the width of the structure in coincidence with the roofs of the ribs 3, the joists being fitted with a staging 10 mounted on joists 9. The connections between the ribs 3, vertical posts 22 and the base members 65 are effected in accordance with normal engineering practice, the structure being anchored by stakes 20. It will be appreciated that the weight of the arched structure is spread to a considerable extent by the combination of the posts 22, ribs 3 and bearers 65 and consequently the whole structure may be erected on a site without the necessity of excavating foundations.

Figure 16 is a similar view to Fig. 11 in which the roller guide or runway 35 is mounted directly on the outer rib member 3 which also carries the hood 36, the said hood having attached thereto a flap 66 of flexible material which rests upon the curtains 37 and 38.

It will be appreciated that the invention is capable of modification in many respects, for example, the hood may comprise a single component consisting of a number of arcuate ribs pivoted at their ends at the eaves of the roof and covered with fabric, the arrangement being such that the hood can be folded down to close the end of the hangar and opened up with the ribs lying against the arched edge of the roof somewhat in the manner of a perambulator hood. Furthermore, although the invention has been more particularly described in relation to the housing of aircraft, the hangar or shelter is equally applicable for domestic use such as the housing of evacuees, the shelters being erected, for example, as satelite towns. The shelters are useful for housing generally and are easily divisible by partitions into rooms by the use of a light framework to which is applied a wall board such as that known under the trade-mark Tentest; sliding doors could, under certain circumstances, be used to close the open ends of the roof structure. Furthermore, the hangar is so designed that the load is spread and the digging of foundations thereby avoided. When in use for aircraft, it will be appreciated that the platforms 10 may be ocupied by aircraft personnel as sleeping quarters and/or for workshops or servicing bays.

What we claim and desire to secure by Letters Patent is:

1. In an aircraft hangar, a flatly arched roof having its side edges resting on the ground, and a closure at each end of the roof, each closure consisting of a pair of curtains each having one edge mounted on an end edge of the roof and a second edge engaging the ground and extending arcuately therealong to a point on the longitudinal median line of the roof, each having a third edge meeting the corresponding edge of the other curtain of the pair in end closing position, and means to connect the first mentioned edge of each curtain to the roof.

2. In an aircraft hangar, a flatly arched roof having its side edges resting on the ground, and a closure at each end of the roof, each closure consisting of a pair of curtains each having one edge mounted on an end edge of the roof and a second edge engaging the ground and extending arcuately therealong to a point on the longitudinal median line of the roof, each having a third edge meeting the corresponding edge of the other curtain of the pair in end closing position, a roller guide carried by each end of the roof and conforming in curvature thereto, rollers attached to the first mentioned edge of each curtain and running in said guide, and a hood carried by each roof end and extending over the respective guide.

3. In an aircraft hangar, a flatly arched roof having its side edges resting on the ground, and a closure at each end of the roof, each closure consisting of a pair of curtains each having one edge mounted on an end edge of the roof and a second edge engaging the ground and extending arcuately therealong to a point on the longitudinal median line of the roof, each having a third edge meeting the corresponding edge of the other curtain of the pair in end closing position, a roller guide carried by each end of the roof and conforming in curvature thereto, rollers attached to the first mentioned edge of each curtain and running in said guide, a hood carried by each roof end and extending over the respective guide, bars fixed to the ground parallel to the ends of the roof and spaced from the respective closures, and means connecting said bars to the ground contacting edges of the closures, said roof and closures being free from external projections.

WILLIAM CHARLES INMAN.
GRAHAM RICHARDS DAWBARN.